US012377374B2

(12) United States Patent
Kim et al.

(10) Patent No.: US 12,377,374 B2
(45) Date of Patent: Aug. 5, 2025

(54) WATER PURIFIER

(71) Applicant: COWAY CO., LTD., Gongju-si (KR)

(72) Inventors: Kyujun Kim, Seoul (KR); Manuk Park, Seoul (KR); Chanjung Park, Seoul (KR); Hee Joo Kang, Seoul (KR); Da Woon Jung, Seoul (KR); Nam Ho Lee, Seoul (KR); Sang Woo Bang, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 338 days.

(21) Appl. No.: 18/005,273

(22) PCT Filed: Jul. 13, 2021

(86) PCT No.: PCT/KR2021/008987
§ 371 (c)(1),
(2) Date: Jan. 12, 2023

(87) PCT Pub. No.: WO2022/015027
PCT Pub. Date: Jan. 20, 2022

(65) Prior Publication Data
US 2023/0249109 A1    Aug. 10, 2023

(30) Foreign Application Priority Data
Jul. 13, 2020  (KR) .................. 10-2020-0085825

(51) Int. Cl.
*B01D 35/30*      (2006.01)
*B01D 35/04*      (2006.01)
(Continued)

(52) U.S. Cl.
CPC .......... *B01D 35/306* (2013.01); *B01D 35/04* (2013.01); *B01D 35/12* (2013.01); *B01D 35/157* (2013.01)

(58) Field of Classification Search
CPC ...... B01D 35/306; B01D 35/04; B01D 35/12; B01D 35/157; B01D 35/18;
(Continued)

(56) References Cited

U.S. PATENT DOCUMENTS

2018/0078884 A1   3/2018 Joo et al.

FOREIGN PATENT DOCUMENTS

JP       2008-178876 A     8/2008
KR    10-2010-0004228 A    1/2010
(Continued)

OTHER PUBLICATIONS

International Search Report issued Oct. 19, 2021 in PCT/KR2021/008987, filed on Jul. 13, 2021, 3 pages.
(Continued)

*Primary Examiner* — Waqaas Ali
(74) *Attorney, Agent, or Firm* — Oblon, McClelland, Maier & Neustadt, L.L.P.

(57) ABSTRACT

A water purifier includes: a case including components; a cover mounted to the case to be opened and closed; a support frame mounted to the inside of the case and having at least one mounting part; a filter module detachably mounted to the case through the mounting part to filter and purify introduced raw water; a first flow path module including at least one flow path through which raw water flows and detachably mounted to the case between the case and the support frame to fix the filter module to the inside of the case; a second flow path module including at least one flow path through which purified water flows and which is connected to the components and the filter module, the second flow path module being detachably mounted to the case through the mounting part; and a faucet module mounted to the case to discharge purified water.

19 Claims, 13 Drawing Sheets

(51) Int. Cl.
*B01D 35/12* (2006.01)
*B01D 35/157* (2006.01)

(58) Field of Classification Search
CPC .... B01D 35/1573; C02F 1/02; C02F 2101/20; C02F 2201/004; C02F 2201/005; C02F 2209/40; C02F 2303/04; C02F 1/003
See application file for complete search history.

(56) References Cited

FOREIGN PATENT DOCUMENTS

| KR | 101818390 B1 | * | 1/2010 |
| KR | 10-2015-0068172 A | | 6/2015 |
| KR | 10-2015-0104377 A | | 9/2015 |
| KR | 20180110809 A | * | 1/2018 |
| KR | 10-2018-0110809 A | | 10/2018 |
| KR | 20100004228 A | * | 10/2018 |
| WO | WO 2017/104971 A1 | | 6/2017 |

OTHER PUBLICATIONS

Extended European Search Report issued Jun. 24, 2024 in European Application No. 21842227.7, 7 pgs.

* cited by examiner

WATER PURIFIER

TECHNICAL FIELD

The present disclosure relates to a water purifier, and more particularly, to a water purifier capable of self-management, which enables a user to easily replace a filter for purifying and filtering raw water and a flow path through which the raw water or purified water flows, to increase the efficiency of the management of the filter and the flow path and reduce management costs.

BACKGROUND

In general, a water purifier is a device for purifying raw water supplied from a raw water supply source such as a water supply or a mineral water bottle, which supplies purified water to a user by removing impurities, heavy metals and other harmful substances, contained in raw water through a physical or chemical method such as precipitation, filtration, and sterilization.

The water purifier has a structure in which supplied raw water flows to sequentially pass through different filtering members provided in the filter, and clean water, which is purified water, is finally supplied to a user.

That is, a conventional water purifier includes an inlet hole through which raw water is introduced in the water purifier, an outlet hole through which filtered purified water is discharged, at least one filter for filtering and purifying the introduced raw water, a plurality of pipes connecting respective components while forming flow paths through which the introduced raw water flows.

In addition, various sensors, various components including various valves, a branch pipe, a nipple, and the like are mounted between the respective pipes or at a portion where the respective pipes and the components are connected to each other.

The water purifier configured as described above needs to be periodically cleaned or replaced to prevent bacteria or microorganisms from inhabiting in a filter, a pipe, or a faucet after a predetermined time of use.

However, in the conventional water purifier as described above, a professional engineer in the water purifier field (generally, referred to as a water purifier coordinator) needs to visit to clean or replace the filter, the pipe, or the faucet, and there is a disadvantage in that the filter, the pipe, and the faucet should be cleaned using a disinfectant such as chlorine or steam, or the filter or the pipe should be replaced.

In addition, in order for a professional engineer of a water purifier company to inspect a filter, a pipe, a faucet, and the like, there is the inconvenience that the professional engineer necessarily enters a place where a water purifier is installed and performs the work, which may violate personal privacy and may cause a security problem.

Further, the inspection of the water purifier needs to be performed according to a personal schedule of the professional engineer of the water purifier company, and the inspection of the water purifier cannot be performed if there is no person in a corresponding household on the inspection date of the water purifier, thereby making it difficult to inspect the water purifier regularly and collectively, and increasing the overall management costs due to the separate costs incurred according to the visit of the professional engineer.

In addition, when the regular and collective check of the water purifier is not performed, the degree of hygiene of the water purifier is lowered, which deteriorates reliability and may cause a problem of damaging user health.

Meanwhile, as water purifiers which may be directly managed by a user, Korean Patent Laid-Open Publication No. 10-2003-0078433 entitled "Storage Tank of Water Purifier", Korean Patent Registration No. 10-1987942 entitled "One-Touch Flow Path Replacement Modular Water Purifier", and Korean Patent Laid-Open Publication No. 10-2019-0024760 entitled "Self-Managed Water Purifier" are known.

However, Korean Patent Laid-Open Publication No. 10-2003-0078433 entitled "Storage Tank of Water Purifier" relates to a structure in which only a storage tank provided in a water purifier may be detached from the water purifier and cleaned by a user, and Korean Patent Registration No. 10-1987942 entitled "One-Touch Flow Path Replacement Modular Water Purifier" considers only the replacement of a water discharge flow path (purified water flow path), but does not suggest the structure and arrangement of modules for securing the convenience of self-management in the overall water purification system such as a raw water flow path, a filter, and a purified water flow path.

In addition, Korean Patent Laid-Open Publication No. 10-2019-0024760 entitled "Self-Managed Water Purifier" only considers replacement of a filter, but does not mention management related to a flow path through which raw water and purified water flow, and thus still poses a problem requiring a professional engineer of a water purifier company to manage the flow path inside the water purifier.

The above description is made to enhance understanding of the background of the present disclosure, and may include contents that are not known to those skilled in the art.

DETAILED DESCRIPTION OF INVENTION

Technical Problems

In view of the above, the present disclosure has been conceived to solve the above problems, and an object of the present disclosure is to provide a water purifier that enables a user to simply and conveniently replace a filter and a pipe without a visit by a professional engineer, thereby reducing management and maintenance costs.

Another object of the present disclosure is to provide a water purifier that eliminate security concerns while maintaining personal privacy, and improves the hygiene and reliability of the water purifier as the user can check the water purifier regularly and collectively.

Another object of the present disclosure is to provide a water purifier that guides a user to easily replace modules having different replacement cycles by suggesting a structure and arrangement of modules that are easily self-managed in an overall water purification system structure such as water intake, filtration, and water discharge.

Technical Solution

In order to accomplish the above object, a water purifier according to an embodiment of the present disclosure, including: a case forming an outer appearance of the water purifier and including a plurality of components provided therein; a cover mounted to the case to be opened and closed; a support frame mounted to the inside of the case and having at least one mounting part; a filter module detachably mounted to the case through the at least one mounting part and serving to filter and purify introduced raw water; a first flow path module including at least one flow path through which raw water flows and detachably mounted to the case between the case and the support frame to fix the filter module to the inside of the case; a second flow path module including at least one flow path through which purified water flows and which is connected to the components and the filter module, the second flow path module being detachably mounted to the case through the at least one mounting part; and a faucet module mounted to the case to discharge purified water which has been filtered and purified through the components.

The at least one mounting part may include: a first mounting part in which the filter module is mounted; and a second mounting part in which the second flow path module is mounted, wherein the second mounting part is disposed at a position adjacent to the first mounting part.

The filter module may include: a filter housing having a first handle protruding from one surface thereof; and at least one filter detachably mounted on the other surface of the filter housing.

The filter housing may include: an inflow part, formed at one side to supply raw water to the filter, through which raw water is introduced; and a discharge part, formed at another side opposite to the inflow part, through which purified water filtered and purified by the filter is discharged.

The first flow path module may include: a fixing housing having at least one filter hole into which the filter module is inserted; at least one nipple provided in the fixing housing to correspond to the inflow part; and at least one connection pipe connecting the inflow part and the at least one nipple.

A holder may be rotatably provided at one side of an upper portion of the fixing housing, and the filter module may be fixed to the first flow path module through the holder in a state in which the filter module is inserted into the filter hole.

The holder may be connected to a valve provided in the fixing housing to control introduction of raw water, and be operated to control opening and closing of the valve according to a rotation operation thereof.

When fixing the filter module, the holder may be rotated in one direction toward the filter module mounted in the at least one mounting part to lock the filter module to the first flow path module while opening the valve simultaneously.

When the filter module is detached, the holder may be rotated to be separated from the filter module to release locking of the filter module from the first flow path module while closing the valve simultaneously.

The at least one filter may include a composite filter.

The second flow path module may include: a flow path housing having one open surface and including a space formed therein; a housing cover detachably coupled to the open surface of the flow path housing and including a second handle protruding outwardly; at least one nipple provided in the space of the flow path housing and connected to the plurality of components provided in the case; and at least one connection pipe provided in the space and connected to the at least one nipple to form the at least one flow path.

One of the at least one nipple, which is disposed at a position adjacent to the filter module, may be directly connected to the filter module so that the purified water discharged from the filter module flows into the second flow path module.

The at least one nipple provided in the second flow path module may be connected to a sterilization module, a cooler, or a valve, or a flow rate sensor, among the plurality of components.

The support frame may be provided with a removal device for fixing the second flow path module mounted in the at least one mounting part to the support frame to correspond to the second flow path module or removing the second flow path module from the at least one mounting part.

The removal device may include: a detachment switch mounted to be insertable from one surface of the support frame toward an inside of the case; and a locker rotatably mounted to an outer side of the other surface of the support frame at a position corresponding to the detachment switch so as to be operated in conjunction with the detachment switch depending on whether the detachment switch is inserted, and configured to lock or unlock the second flow path module to or from the support frame.

The locker may include: a rotation shaft rotatably mounted on the other surface of the support frame at a position corresponding to the at least one mounting part in which the second flow path module is mounted; a hook part extending from the rotation shaft to correspond to the detachment switch and formed to be bent in multiple stages so as to be partially inserted from an outside of the support frame toward the inside of the at least one mounting part when the second flow path module is mounted in the at least one mounting part; and an ejecting part extending from the rotation shaft toward an opposite side to the hook part and formed to be bent so as to protrude from an outside of the other surface of the support frame toward the other surface of the second flow path module according to an operation of the detachment switch.

The flow path housing may have a locking groove formed in one surface thereof corresponding to the hook part so that the hook part is inserted therein.

The at least one mounting part, in which the second flow path module is inserted, may be provided with opening holes formed at positions corresponding to the hook part and the ejecting part, respectively.

The faucet module may include: a faucet housing having one end detachably inserted into the case to be connected to the components provided in the case so that the faucet housing protrudes to an outside of the case by a set length, the faucet housing including a flow path formed therein so as to discharge purified water, cold water, or hot water which has been filtered and purified while passing through the filter module; and a faucet cover detachably mounted on the case while surrounding an outside of the faucet housing.

A discharge pipe may be provided inside the faucet housing to discharge purified water, purified cold water, or purified hot water to the outside of the faucet housing, and the discharge pipe may be connected to each of a purified water discharge pipe, a cold water discharge pipe, and a hot water discharge pipe inside the case.

Locking plates for fixing or detaching the faucet housing inserted into the case by a predetermined length to or from the case may be integrally formed at both sides of the faucet housing, respectively.

Each of the locking plates may include: a fixed end portion which is one end of the locking plate and faces the case to be fixed to the faucet housing; a free end portion which is the other end of the locking plate and faces the outside of the case to be extended from the fixed end portion and elastically supported by the fixed end portion; and a locking protrusion protruding toward the outside of the faucet housing between the fixed end portion and the free end portion.

The free end portion may be formed to be insertable from the outside of the faucet housing toward the inside thereof, and provide an elastic force from the fixed end portion toward the outside of the faucet housing.

The locking protrusion may prevent the faucet housing mounted in the case from being detached from the case.

Effect of Invention

As described above, the water purifier according to an embodiment of the present disclosure can reduce management and maintenance costs by enabling a user to conveniently replace the filter and the pipes without a visit of a professional engineer.

Further, the present disclosure has an effect of stably mounting the filter module by applying the flow path module for fixing the filter module, on which at least one filter is mounted, to the inside of the case.

Further, according to the present disclosure, there is no need to worry about security problems while maintaining personal privacy, and a user can directly check the water purifier regularly and collectively, thereby improving hygiene and reliability of the water purifier.

Also, the present disclosure enables the user to easily replace the filter, the pipe, and the faucet, thereby improving convenience, and enables self-management of the water purifier to thereby provide reliability to the users and improve overall marketability.

In addition, the present disclosure proposes a structure and arrangement of modules which are easy to self-manage in an overall water purification system structure such as water intake, filtration, and water supply, thereby providing a guide for the user to easily replace the modules having different replacement cycles.

BEST MODE FOR CARRYING OUT THE INVENTION

Figure 1:
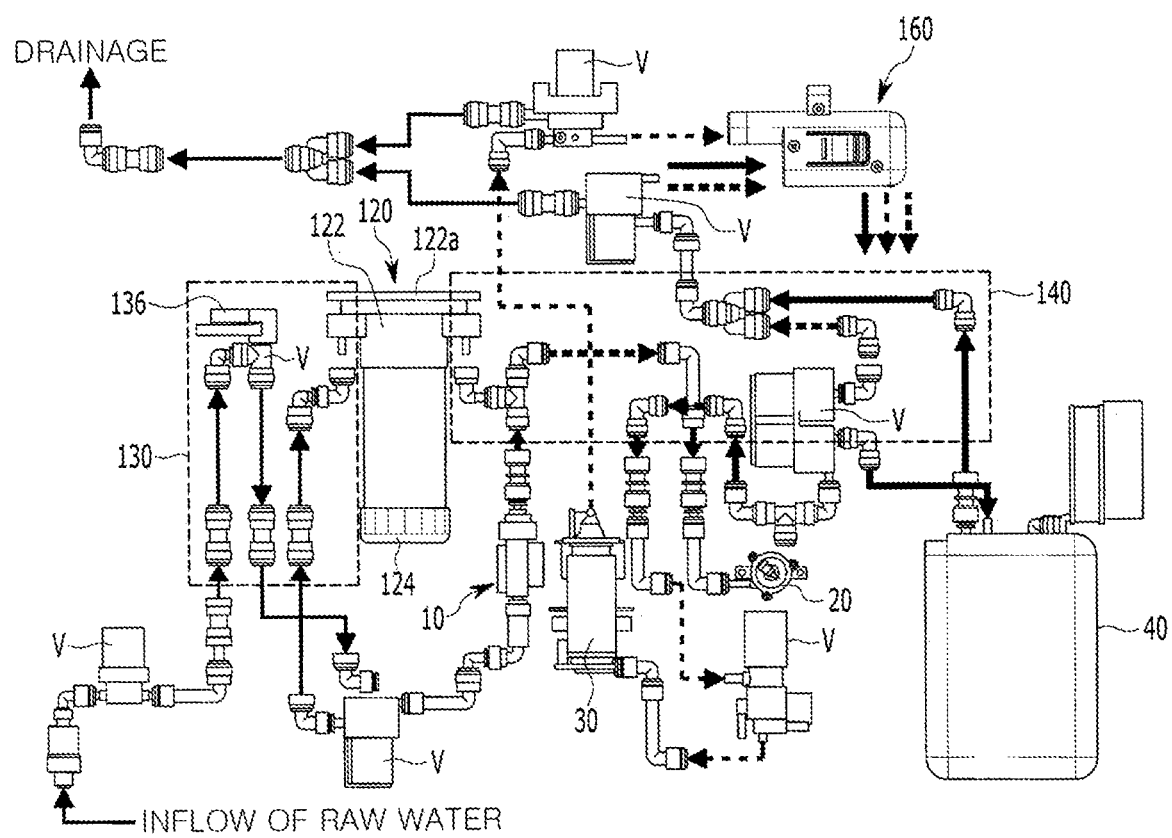
FIG. 1 is a flow path diagram illustrating a flow path through which raw water and purified water flow in a water purifier according to an embodiment of the present disclosure.

Hereinafter, a preferred embodiment of the present disclosure will be described in detail with reference to the accompanying drawings.

First, it should be understood that the embodiments described in the present specification and the configurations illustrated in the drawings are merely the most preferred embodiments of the present disclosure and do not represent all of the technical spirit of the present disclosure, so there may be various equivalents and modified examples capable of replacing them at the time of filing the present application.

In order to clearly describe the present disclosure, parts that are not related to the description are omitted, and the same or similar components are denoted by the same reference numerals throughout the specification.

Since the size and thickness of each component illustrated in the drawings are arbitrarily illustrated for convenience of description, the present disclosure is not necessarily limited to those illustrated in the drawings, and the thickness is enlarged and illustrated in order to clearly express various portions and regions.

Throughout the specification, when a part "includes" a component, this means that other components may be further included, rather than excluding other components, unless specifically stated otherwise.

In addition, terms such as ". . . unit", ". . . means", ". . . part", and ". . . member" described in the specification mean a unit of a comprehensive configuration performing at least one function or operation.

Figure 2:
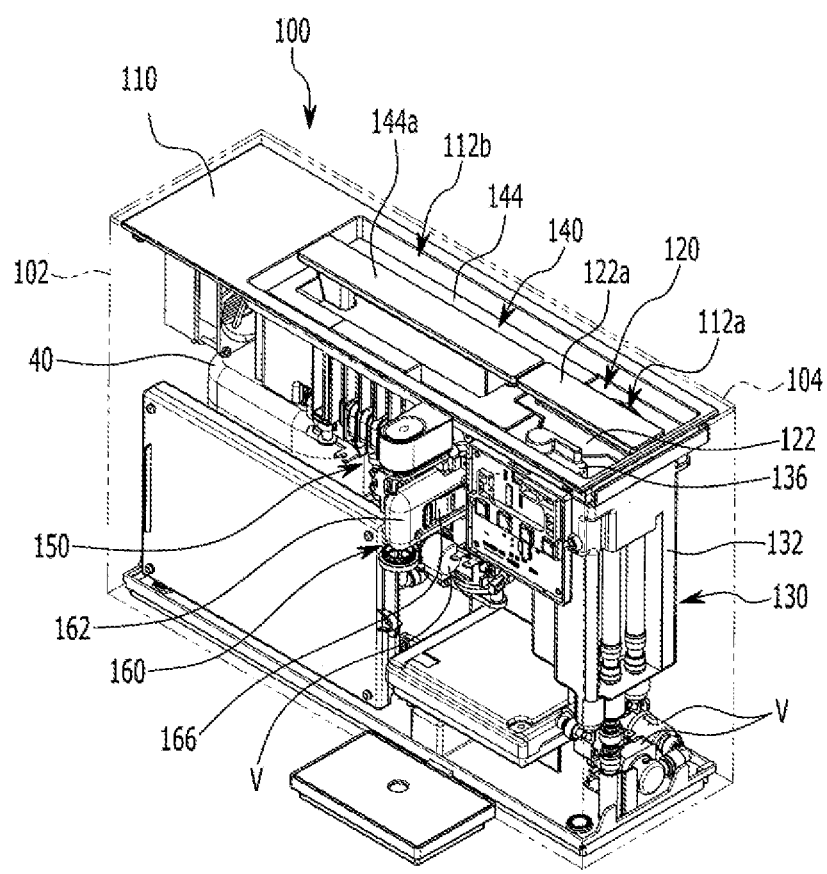
FIG. 2 is a projected perspective view of the water purifier according to the embodiment of the present disclosure.
Figure 3:
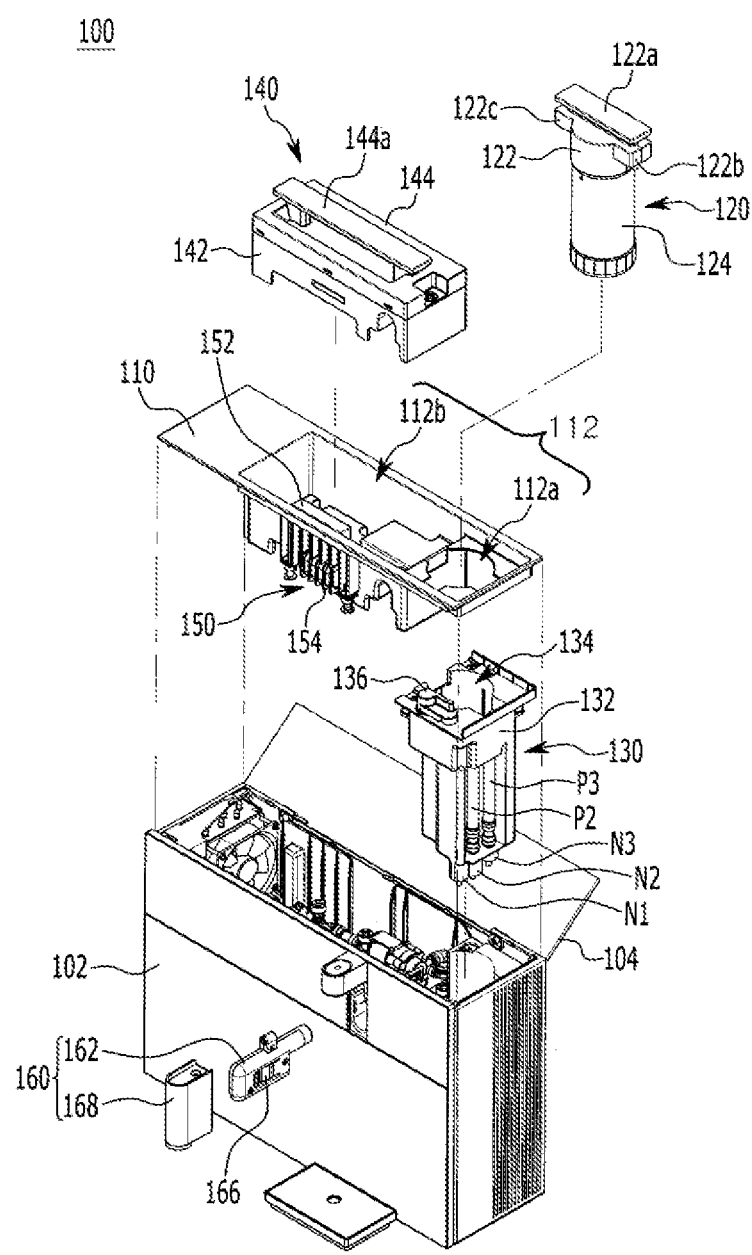
FIG. 3 is an exploded perspective view of the water purifier according to the embodiment of the present disclosure.
Figure 4:
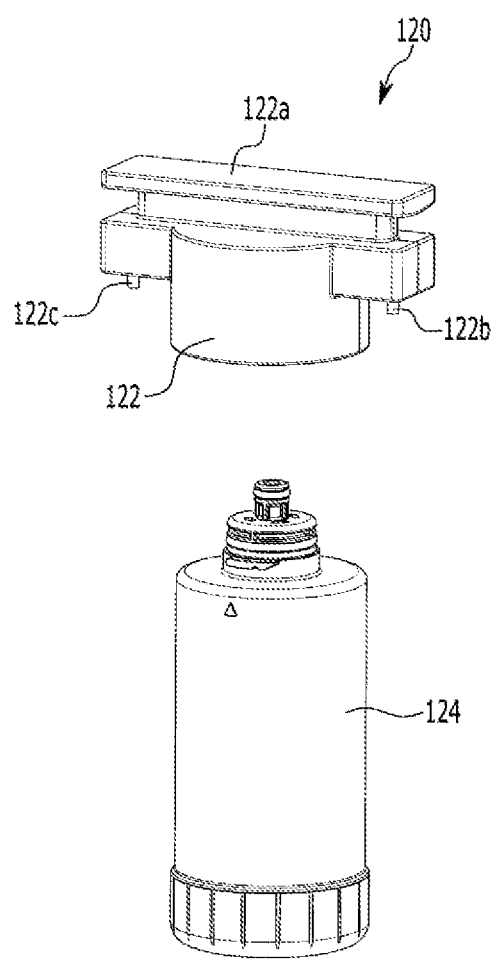
FIG. 4 is an exploded perspective view of a filter module applied to the water purifier according to the embodiment of the present disclosure.
Figure 5:
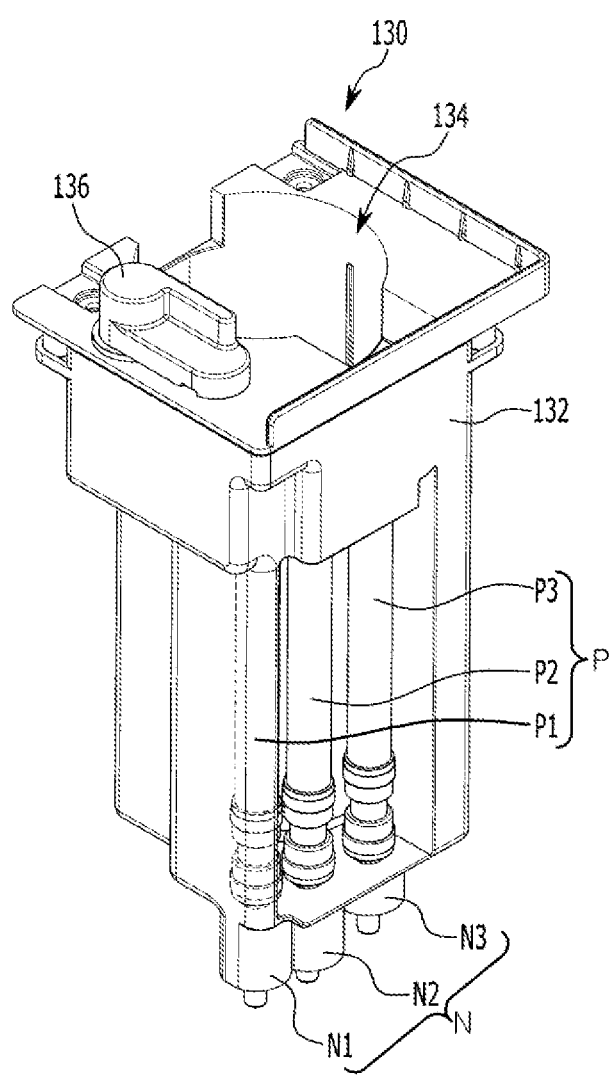
FIG. 5 is a perspective view of a first flow path module applied to the water purifier according to the embodiment of the present disclosure.
Figure 6:
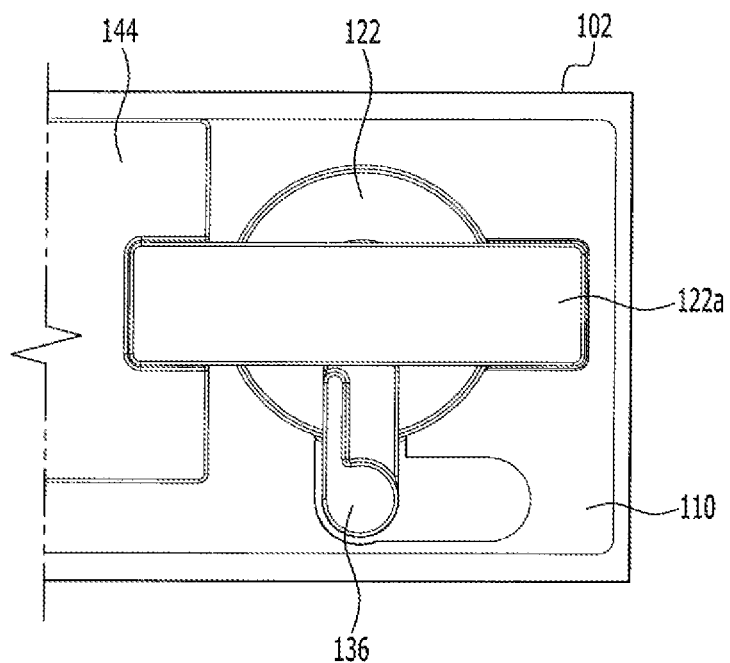
FIGS. 6 and 7 are operational state diagrams of a holder applied to the first flow path module in the water purifier according to the embodiment of the present disclosure.
Figure 7:
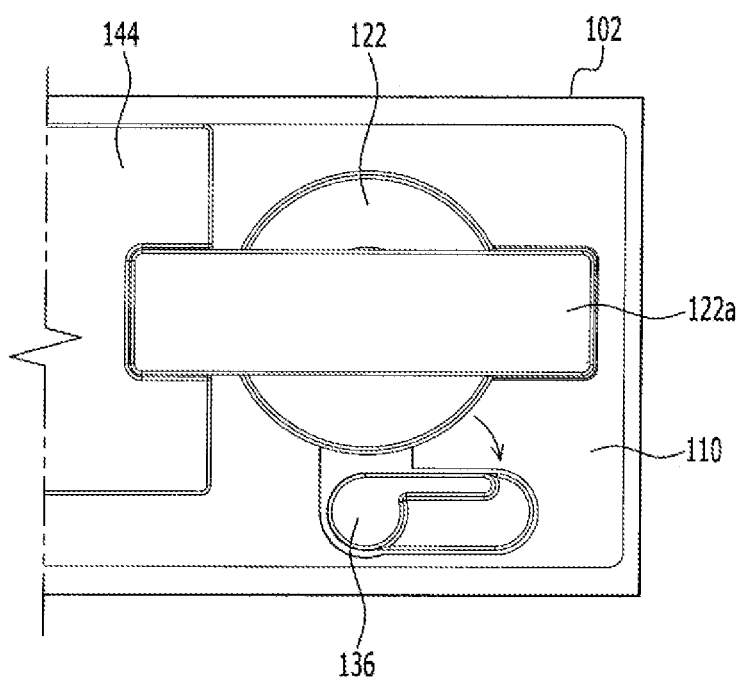
Figure 8:
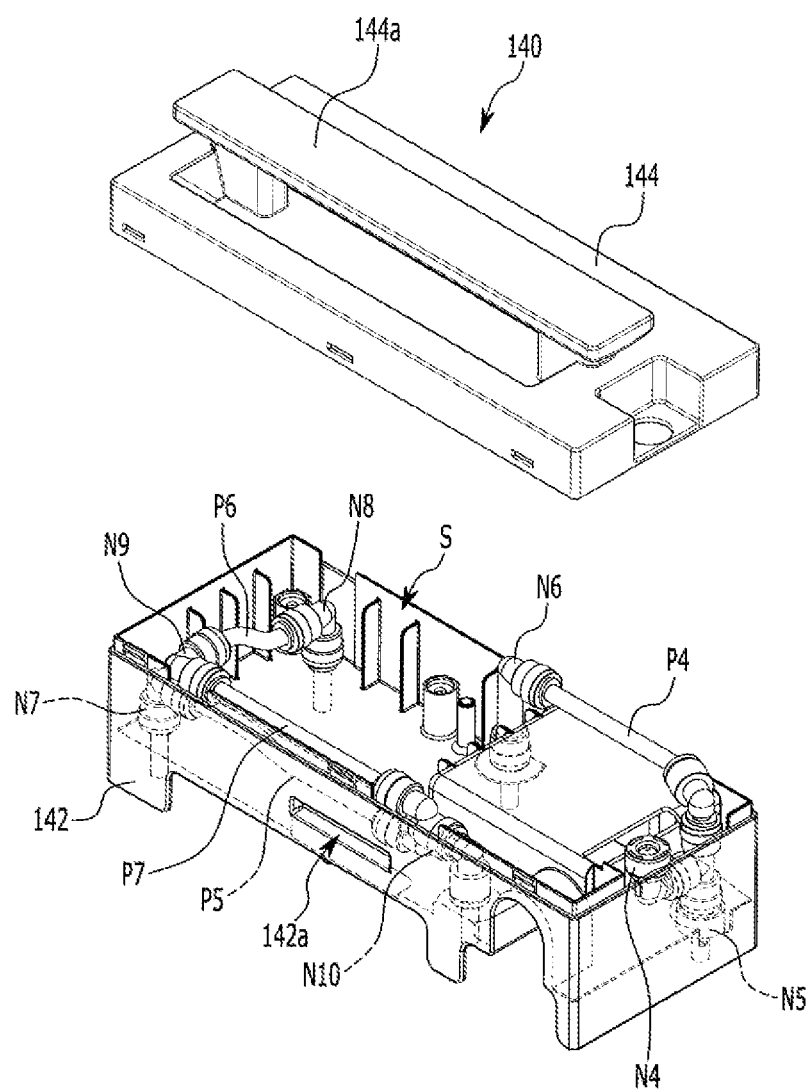
FIG. 8 is an exploded perspective view of a second flow path module applied to the water purifier according to the embodiment of the present disclosure.
Figure 9:
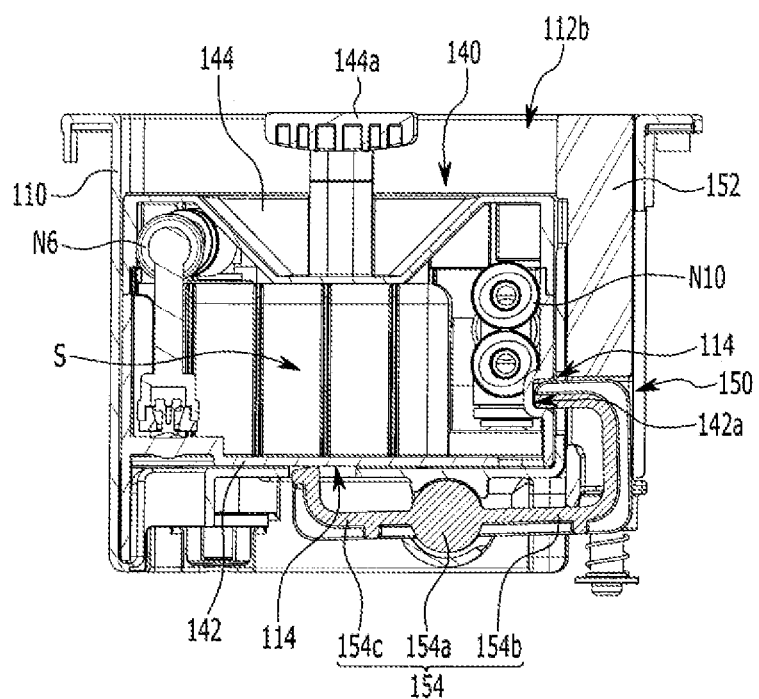
FIG. 9 is a cross-sectional view of a removal device applied to the water purifier according to the embodiment of the present disclosure.
Figure 10:
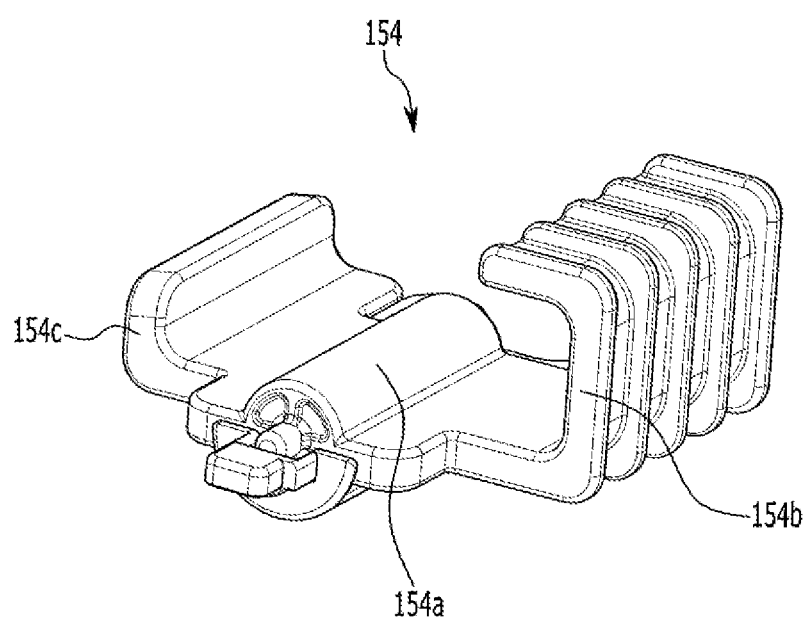
FIG. 10 is a perspective view of a locker applied to the removal device of the water purifier according to the embodiment of the present disclosure.
Figure 11:
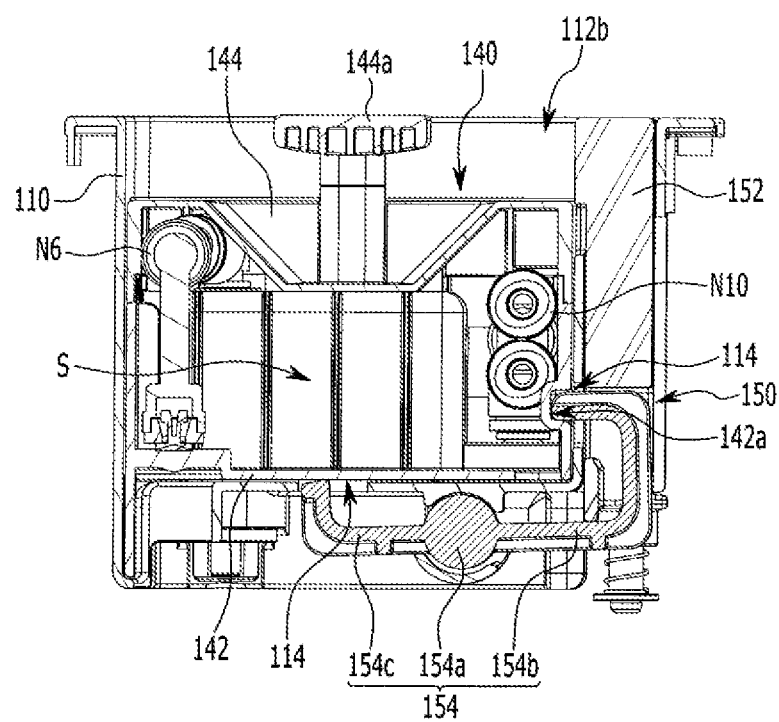
FIGS. 11 and 12 are operational state diagrams of the removal device applied to the water purifier according to the embodiment of the present disclosure.
Figure 12:
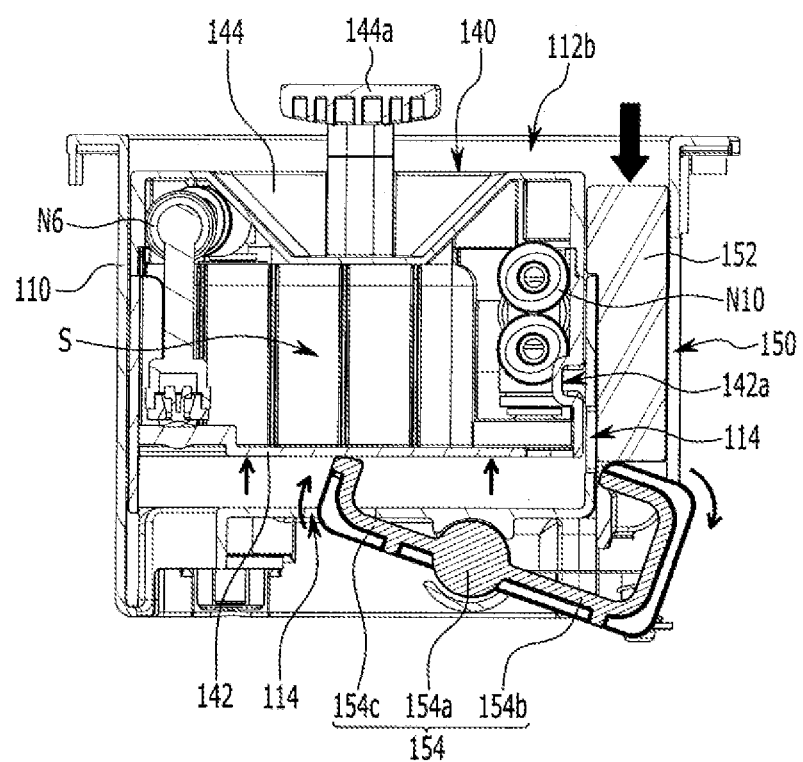
Figure 13:
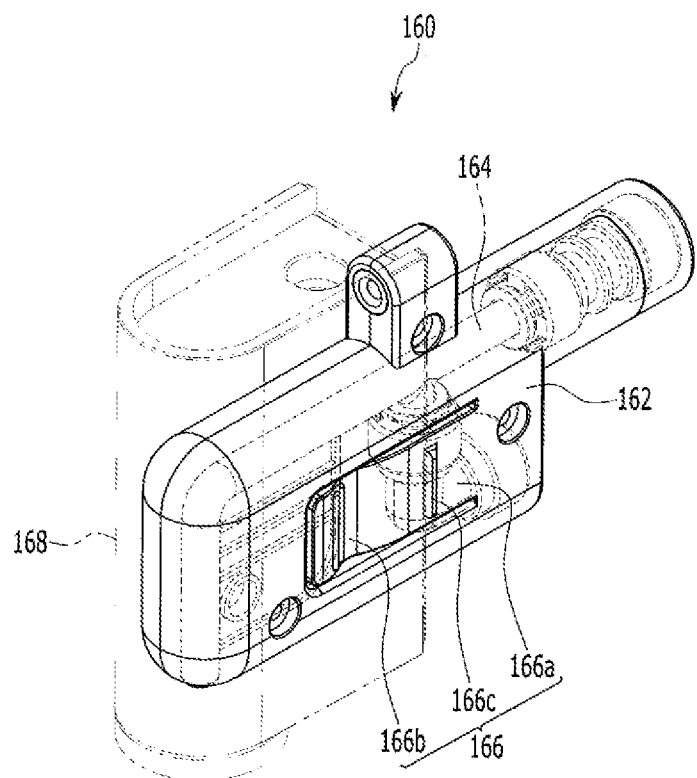
FIG. 13 is a projected perspective view of a faucet module applied to the water purifier according to the embodiment of the present disclosure.

FIG. 1 is a flow path diagram illustrating a flow path through which raw water and purified water flow in a water purifier according to an embodiment of the present disclosure, FIGS. 2 and 3 are a projected perspective view and an exploded perspective view of the water purifier according to the embodiment of the present disclosure, FIG. 4 is an exploded perspective view of a filter module applied to the water purifier according to the embodiment of the present disclosure, FIG. 5 is a perspective view of a first flow path module applied to the water purifier according to the embodiment of the present disclosure, FIGS. 6 and 7 are operational state diagrams of a holder applied to the first flow path module in the water purifier according to the embodiment of the present disclosure, FIG. 8 is an exploded perspective view of a second flow path module applied to the water purifier according to the embodiment of the present disclosure, FIG. 9 is a cross-sectional view of a removal device applied to the water purifier according to the embodiment of the present disclosure, FIG. 10 is a perspective view of a locker applied to the removal device of the water purifier according to the embodiment of the present disclosure, FIGS. 11 and 12 are operational state diagrams of the removal device applied to the water purifier according to the embodiment of the present disclosure, and FIG. 13 is a projected perspective view of a faucet module applied to the water purifier according to the embodiment of the present disclosure.

Referring to FIGS. 1 and 2, a water purifier 100 according to an embodiment of the present disclosure is applied to reduce management and maintenance costs by allowing a user to easily replace a filter 124 and pipes without a visit of a professional engineer.

Meanwhile, the water purifier 1 according to the embodiment of the present disclosure is applied to a direct water supply type water purifier in which no pump is provided and tap water is introduced as raw water from a water supply, as an example.

The water purifier 100 according to the embodiment of the present disclosure may include a case 102, a cover 104, a support frame 110, a filter module 120, a first flow path module 130, a second flow path module 140, and a faucet module 160.

Here, the filter module 120, the first flow path module 130, the second flow path module 140, and the faucet module 160 are connected through one or more components and connection pipes so that raw water, purified water, purified cold water, or purified hot water flows.

The one or more components may include a plurality of valves V, a sterilization module 10, a flow rate sensor 20, an instantaneous water heater 30, a cooler 40, and the like.

Prior to a detailed description of each component, the flow of raw water and purified water in the water purifier 1 according to the embodiment of the present disclosure will be described with reference to FIG. 1

First, when a user operates the water purifier 100, raw water, which is tap water, is introduced into the first flow path module 130, and the introduced raw water flows to the filter module 120 or the sterilization module 10 by the operations of the valve V provided in the first flow path module 130 and the valve V provided in the sterilization module 10.

In this case, the sterilization module 10 may generate sterilized water by performing electrolysis on the introduced raw water and may allow the generated sterilized water to flow into the respective pipes provided in the water purifier 100, thereby sterilizing the pipes where the sterilized water flows.

In addition, since the sterilized water does not need to be filtered and purified, the sterilized water may be converted into hot water or cold water without passing through the filter module 120 to be provided to the user, or may be provided to the user as it is.

The purified water filtered and purified while passing through the filter module 120 or the sterilized water passing through the sterilization module 10 is introduced into the second flow path module 140 and discharged from the second flow path module 140 to pass through the flow rate sensor 20.

In this case, the purified water or the sterilized water passing through the flow rate sensor 20 may pass through the instantaneous water heater 30 or the cooler 40 via the second flow path module 140 through selective operation of each valve V by manipulation of the user.

Here, the purified water or the sterilized water may be converted into hot water when passing through the instantaneous water heater 30, and may be converted into cold water when passing through the cooler 40, and the converted hot water or cold water may be discharged to the outside of the water purifier 100 through the faucet module 160.

Meanwhile, when the purified water or the sterilized water passing through the flow rate sensor 20 does not pass through the instantaneous water heater 30 or the cooler 40, the purified water or the sterilized water may be discharged to the outside of the water purifier 100 through the faucet module 160 by an operation of the valve V connected to the faucet module 160.

Hereinafter, the case 102, the cover 104, the support frame 110, the filter module 120, the first flow path module 130, the second flow path module 140, and the faucet module 160 included in the water purifier 100 having the flow of raw water and purified water as described above will be described in detail with reference to FIGS. 2 to 13.

First, the case 102 forms the outer appearance of the water purifier 100, and a plurality of components are provided therein.

The cover 104 is openably mounted on the case 102. In the present embodiment, an upper side of the case 102 is opened, and the cover 104 may be mounted at an upper portion of the case 102 to be rotated to open and close the opened upper side of the case 102.

The support frame 110 is mounted inside the case 102 between the case 102 and the cover 104. At least one mounting part 112 may be provided to the support frame 110.

The support frame 110 may be mounted on the case 102 in a magnetic attachment/detachment manner without a separate fastening means so as to be easily detached from the case 102 by an external force of a user.

Here, the at least one mounting part 112 may include a first mounting part 112a for mounting the filter module 120, and a second mounting part 112b disposed adjacent to the first mounting part 112a to mount the second flow path module 140. In addition, the first mounting part 112a and the second mounting part 112b may be integrally formed.

In the present embodiment, as illustrated in FIG. 4, the filter module 120 is detachably mounted to the case 102 through the first mounting part 112a. The filter module 120 may filter and purify the introduced raw water.

Here, the filter module 120 includes a filter housing 122 and at least one filter 124.

First, the filter housing 122 has a first handle 122a protruding from one surface facing upward.

The filter housing 122 may include an inflow part 122b and a discharge part 122c.

The inflow part 122b is formed at one side of the filter housing 122 to supply raw water to the filter 124, and raw water is introduced in the inflow part 122b. In addition, the discharge part 122c is formed at another side of the filter housing 122 opposite to the inflow part 122b, and purified water filtered and purified by the filter 124 is discharged through the discharge part 122c.

The at least one filter 124 may be detachably mounted on the other surface of the filter housing 122. Here, the at least one filter 124 may be a composite filter.

Meanwhile, although only one filter 124 is mounted in the filter housing 122 in the present embodiment, the present disclosure is not limited thereto, and a plurality of filter mounting parts may be provided in the filter housing 122 to mount a plurality of filters.

In the present embodiment, the first flow path module 130 is provided with at least one flow path through which raw water flows, and is detachably mounted to the case 102 between the case 102 and the support frame 110 so as to fix the filter module 120 to the inside of the case 102.

As shown in FIG. 5, the first flow path module 130 may include a fixing housing 132, at least one nipple N, and at least one connection pipe P.

First, the fixing housing 132 is detachably mounted to the case 102 through a fastening means such as a bolt between the case 102 and the support frame 110.

At least one filter hole 134 into which the filter module 120 is inserted may be formed in the fixing housing 132, and in the present embodiment, one filter hole 134 is formed to correspond to the single filter 124.

The number of the filter holes 134 may be varied depending on the number of filters 124.

The at least one nipple N may be formed to protrude downward from the lower surface of the fixing housing 132 to correspond to the inflow part 122b.

In the present embodiment, the at least one nipple N may include a first nipple N1 into which raw water is introduced, a second nipple N2 connected to the valve V connected to the sterilization module 10, and a third nipple N3 for supplying the raw water from the valve V connected to the sterilization module 10 to the filter module 120.

Further, the at least one connection pipe P may connect the inflow part 122b to the first, second, and third nipples N1, N2, and N3.

In the present embodiment, the at least one connection pipe P may include a first, a second, and a third connection pipe P1, P2, and P3.

First, the first connection pipe P1 is connected to the first nipple N1 and forms a first flow path. Raw water, which is tap water, may be introduced into the first connection pipe P1 through the first nipple N1.

The second connection pipe P2 is provided inside the first flow path module 130 and connects the valve V1 connected to the first connection pipe P1 to the second nipple N2. The second connection pipe P2 may form a second flow path.

In addition, the third connection pipe P3 may connect the third nipple N3 connected to the valve V connected to the sterilization module 10 to the filter module 120. The third connection pipe P3 may form a third flow path.

The first flow path module 130 configured as described above may be easily detached from the case 102 by the user releasing the fastening means after the support frame 110 is removed in a state in which the filter module 120 is not mounted.

That is, the first flow path module 130 is mounted on the water purifier in such a way that a user may easily detach it.

Here, the filter module 120 may be fixed to the first flow path module 130 through a holder 136 rotatably provided at one side of the upper portion of the fixing housing 132 in a state of being inserted into the filter hole 134.

The holder 136 is connected to the valve V which is provided inside the fixing housing 132 to control the inflow of raw water. This holder 136 may be operated to control the opening and closing of the valve V according to a rotation operation thereof.

That is, as shown in FIG. 6, when the filter module 120 is fixed to the fixing housing 132, the holder 136 may be rotated in one direction toward the filter module 120 mounted in the first mounting part 112a to lock the filter module 120 to the first flow path module 130 while opening the valve V simultaneously.

Accordingly, the filter module 120 may be fixed to the fixing housing 132 by being locked by the holder 136 in a state of being mounted in the first flow path module 130.

On the contrary, as shown in FIG. 7, when the filter module 120 is detached, the holder 136 may be rotated to be separated from the filter module 120 to release the locking of the filter module 120 from the first flow path module 130 while closing the valve V simultaneously.

When the locking of the filter module 120 is released through the above operation, the user may hold the first handle 122a of the filter module 120 and lift the filter module 120 upward from the first flow path module 130. Accordingly, the filter module 120 may be easily detached from the first flow path module 130.

In the present embodiment, in the second flow path module 140, at least one flow path through which purified water flows therein is formed to be connected to the components and the filter module 120. The second flow path module 140 is detachably mounted to the case 102 through the second mounting part 112b.

In this case, as shown in FIG. 8, the second flow path module 140 may include a flow path housing 142, a housing cover 144, at least one nipple N, and at least one connection pipe P.

First, one surface of the flow path housing 142, which faces upward, is opened, and a space S is formed therein.

The housing cover 144 is detachably coupled to the opened one surface of the flow path housing 142. The housing cover 144 may be provided with a second handle 144a protruding upwardly and outwardly.

In the present embodiment, the at least one nipple N is provided in the space S of the flow path housing 142. The at least one nipple N may be connected to a plurality of the components provided in the case 102.

That is, the at least one nipple N may be connected to the sterilization module 10, the instantaneous water heater 30, or the cooler 40 among the plurality of components through the valves V or the flow rate sensor 20.

Meanwhile, the components may be connected to the at least one nipples N through a separate connection tube branch pipe or the like.

In this case, the at least one nipple N may include fourth, fifth, sixth, seventh, eighth, ninth, and tenth nipples N4, N5, N6, N7, N8, N9, and N10.

First, the fourth nipple N4 is provided in the space S, and the discharge part 122c of the filter module 120 is directly connected thereto.

That is, the fourth nipple 120 disposed close to the filter module 120 among the at least one nipple N may be directly connected to the discharge part 122c of the filter module 120 so that the purified water discharged from the filter module 120 is introduced into the second flow path module 140.

The fifth nipple N5 communicates with the fourth nipple N4 and the sterilized water passing through the sterilization module 10 is introduced thereinto.

The sixth nipple N6 is connected to the flow rate sensor 20, and the seventh nipple N7 is connected to one valve V of the valves V connected to the flow rate sensor 20.

The eighth nipple N8 is connected to the cooler 40, the ninth nipple N9 is provided in the space S, and the tenth nipple N10 is connected to one valve V of the valves V connected to the faucet module 160.

The at least one connection pipe P may be provided inside the space S, and may be connected to the fifth to tenth nipples N5, N6, N7, N8, N9, and N10 to form the at least one flow path.

In the present embodiment, the at least one connection pipe P may include fourth, fifth, sixth, and seventh connection pipes P4, P5, P6, and P7.

First, the fourth connection pipe P4 connects the fifth nipple N5 to the sixth nipple N6. The fourth connection pipe P4 may form a fourth flow path.

In this case, in the fourth connection pipe P4, the purified water introduced through the fourth nipple N4 from the filter module 120 may flow to the sixth nipple N6, or the sterilized water introduced through the fifth nipple N5 from the sterilization module 10 may flow to the sixth nipple N6.

The fifth connection pipe P5 connects the seventh nipple N7 to the tenth nipple N10 in the space S. The fifth connection pipe P5 may form a fifth flow path.

In this case, the purified water or the sterilized water introduced into the seventh nipple N7 flows in the fifth connection pipe P5 by the operation of one valve V of the valves V connected to the flow rate sensor 20.

The sixth connection pipe P6 connects the eighth nipple N8 to the ninth nipple N9 in the space S. The sixth connection pipe P6 may form a sixth flow path.

In this case, the cold water introduced from the cooler 40 through the eighth nipple N8 flows in the sixth connection pipe P6.

Further, the seventh connection pipe P7 connects the ninth nipple N9 and the tenth nipple N10 in the space S. The seventh connection pipe P7 may form a seventh flow path.

In this case, the cold water passing through the sixth connection pipe P6 may flow to the seventh connection pipe P7 toward the tenth nipple N10.

Meanwhile, the flow path in the second flow path module 140 is designed so that hot water does not flow, and this is to prevent the hot water from flowing in the second flow path module 140 that can be self-replaced, thereby preventing a risk of burn due to the hot water in advance when the user replaces the second flow path module 140.

That is, in the water purifier 100 according to the embodiment of the present disclosure, in order to reduce the risk upon self-management of the user, the hot water flow path may be designed to bypass the first flow path module 130 and the second flow path module 140 that can be replaced by self-management of the user.

In the present embodiment, the support frame 110 may be provided with a removal device 150, for fixing the second flow path module 140 mounted in the second mounting part 112b to the support frame 110 or removing the second flow path module 140 from the second mounting part 112b, corresponding to the second flow path module 140.

As shown in FIG. 9, the removal device 150 includes a detachment switch 152 and a locker 154.

First, the detachment switch 152 is installed to be insertable from one surface of the support frame 110 which faces upward toward the inside of the case 102.

In addition, the locker 154 is rotatably mounted on the outside of the other surface of the support frame 110 which faces downward at a position corresponding to the detachment switch 152 so as to be operated in conjunction with the insertion of the detachment switch 152.

The locker 154 may lock or unlock the second flow path module 140 to or from the support frame 110.

Here, as shown in FIG. 10, the locker 154 may include a rotation shaft 154a, a hook part 154b, and an ejecting part 154c.

First, the rotation shaft 154a is rotatably mounted on the other surface of the support frame 110 which faces downward at a position corresponding to the second mounting part 112b at which the second flow path module 140 is mounted.

When the second flow path module 140 is mounted in the second mounting part 112b, the hook part 154b extends from the rotation shaft 154a to correspond to the detachment switch 152 so as to be partially inserted from the outside of the support frame 110 toward the inside of the second mounting part 112b.

One end of the hook part 154b may be integrally connected to the rotation shaft 154a, and the other end thereof may be bent in multiple stages toward the side surface of the flow path housing 142.

The ejecting part 154c may extend from the rotating shaft 154a toward the opposite side to the hook part 154b so as to protrude from the outside of the other surface of the support frame 110 toward the other surface of the second flow path module 140 according to the operation of the detachment switch 152.

One end of the ejecting part 154c may be integrally connected to the rotating shaft 154a, and the other end thereof may be bent toward a lower portion of the flow path housing 142.

Here, the flow path housing 142 may be provided with a locking groove 142a formed on one surface thereof corresponding to the hook part 154b so that the hook part 154b is inserted therein.

In addition, opening holes 114 may be formed at positions corresponding to the hook part 154b and the ejecting part 154c, respectively, in the second mounting part 112a into which the second flow path module 140 is inserted.

That is, when the second flow path module 140 is locked while being mounted in the second mounting part 112b, the detachment switch 152 maintains the initial position, as shown in FIG. 11.

At the same time, the hook part 154b is inserted into the locking groove 142a through the opening hole 114 formed to correspond to the locking groove 142a to fix the second flow path module 140 not to be detached from the support frame 110.

On the contrary, when the second flow path module 140 is detached from the second mounting part 112b, as illustrated in FIG. 12, the detachment switch 152 is inserted from the initial position toward the inside of the case 102 by an external force of the user.

In this case, the hook part 154b contacting the lower end of the detachment switch 152 is rotated about the rotation shaft 154a toward the outside of the flow path housing 142 by the inserted detachment switch 152, and is detached from the locking groove 142a.

At the same time, the ejecting part 154c rotates toward the lower surface of the flow path housing 142 about the rotation shaft 154a.

Accordingly, the ejecting part 154c may pass through the corresponding opening hole 114 formed in the lower surface of the flow path housing 142 to push the second flow path module 140 upward from the second mounting part 112b while contacting the lower portion of the second flow path module 140.

When the locking of the second flow path module 140 is released by the operation of the detachment device 150 as described above, the user grasps the second handle 144a of the second flow path module 140 and lifts the second flow path module 140 upward from the second mounting part 112b.

Accordingly, the second flow path module 140 can be easily detached from the support frame 110.

Further, the faucet module 160 is detachably mounted on the case so that purified water, cold water, or hot water, which has been filtered and purified through the components, is discharged through the faucet module 160.

In the present embodiment, the faucet module 160 may be mounted at one side in an upper portion of a front surface of the water purifier 100.

As shown in FIG. 13, the faucet module 160 includes a faucet housing 162 and a faucet cover 168.

First, one end of the faucet housing 162 is inserted into the case 102 to be connected to the components provided in the case 102 so that the faucet housing 162 protrudes to the outside of the case 102 by a set length.

The faucet housing 162 may have a flow path formed therein to discharge purified water which has been filtered and purified while passing through the filter module 120.

Here, a discharge pipe 164 may be provided inside the faucet housing 162 to discharge purified water, purified cold water, or purified hot water to the outside of the faucet housing 162.

The discharge pipe 164 may form an eighth flow path and may be connected to each of the purified water discharge pipe 105, the cold water discharge pipes 107, and the hot water discharge pipe 109 inside the case 102.

That is, the purified water or the sterilized water passing through the filter module 120 or the sterilization module 10 may be supplied to the user as the purified water or the sterilized water through the purified water discharge pipe 105 and the discharge pipe 164 by the operation of the valves V to be connected to the flow rate sensor 20 after passing through the second flow path module 140.

In addition, the purified water or the sterilized water passing through the second flow path module 140 may pass through the instantaneous water heater 30 and then be supplied to the user as hot water through the hot water discharge pipe 109 and the discharge pipe 164 by the operation of the valve V connected to the instantaneous water heater 30.

In addition, the purified water or the sterilized water passing through the second flow path module 140 may pass through the cooler 40 and then be supplied to the user as the cold water through the cold water discharge pipe 107 and the discharge pipe 164 by the operation of the valve V connected to the cooler 40.

Also, the faucet cover 168 is mounted on the case 102 while surrounding the outside of the faucet housing 162.

The faucet cover 168 may be mounted on the case 102 in a magnet attachment/detachment manner so as to be easily detached from the case 102 by an external force of a user without a separate fastening means.

That is, when the faucet module 160 is detached from the case 102, the user may detach the faucet cover 168 from the case 102 and then detach the faucet housing 162.

Meanwhile, locking plates 166 for fixing or detaching the faucet housing 162 inserted into the case 102 by a predetermined length to or from the case 102 are integrally formed at both sides of the faucet housing 162, respectively.

Each of the locking plate 166 may include a fixed end portion 166a, a free end portion 166b, and a locking protrusion 166c.

First, one end of the fixed end portion 166a, which faces the case 102, is fixed to the faucet housing 162.

The free end portion 166b has the other end facing the outside of the case 120 extended from the fixed end portion 166a, and is elastically supported by the fixed end portion 166a.

In this case, the free end portion 166b may be formed to be insertable from the outside of the faucet housing 162 toward the inside thereof, and may provide an elastic force from the fixed end portion 166a toward the outside of the faucet housing 162.

The locking protrusion 166c protrudes toward the outside of the faucet housing 162 between the fixed end portion 166a and the free end portion 166b.

The locking protrusion 166c may prevent the faucet housing 162 mounted in the case 102 from being detached from the case 102.

In the locking plate 166 configured as described above, when the user holds the free end portion 166b and applies an external force to the free end portion 166b in a state in which the faucet housing 162 is fixed to the case 102, the free end portion 166b is inserted from the fixed end portion 166a toward the inside of the faucet housing 162 at both sides.

Accordingly, the locking protrusion 166c releases the fixing of the faucet housing 162 from the case 102. In this state, the user can easily detach the faucet housing 162 from the case 102.

On the contrary, when a replacement faucet housing 162 is mounted to the case 102, the user holds the free end portion 166b and applies an external force so that the free end portion 166b of the new faucet housing 162 is inserted from the fixed end portion 166a into the faucet housing 162 at both sides.

Accordingly, the locking protrusion 166c is inserted into the faucet housing 162. In this state, the user mounts the faucet housing 162 to the case 102.

When the mounting of the faucet housing 162 is completed, the user may release the external force applied to the free end portion 166b.

Then, the free end portion 166b elastically supported by the fixed end portion 166a is returned to the initial position, and at this time, the locking protrusion 166c is locked to the inside of the case 102, thereby completing the fixing of the faucet housing 164.

That is, through the above-described operation, the user can easily perform replacement of the filter module 120, the first flow path module 130, the second flow path module 140, and the faucet module 160 of the water purifier 100 without a professional engineer in the art of water purifiers.

Therefore, when the water purifier 100 according to the embodiment of the present disclosure configured as described above is applied, a user can easily replace the filter module 120, the first flow path module 130, the second flow path module 140, and the faucet module 160 without a visit of a professional engineer, thereby reducing management and maintenance costs.

In addition, according to the present disclosure, by applying the first flow path module 130 for fixing the filter module 120 to the inside of the case 102, the filter module 120 can be stably mounted.

Also, according to the present disclosure, there is no need to worry about security problems while maintaining personal privacy, and a user can directly inspect the water purifier 100 regularly and collectively, so that there is an effect of improving the hygiene and reliability of the water purifier 100.

In addition, according to the present disclosure, the filter 124, the first and second flow path modules 130 and 140 forming a plurality of flow paths, and the faucet module 160 can be easily replaced, thereby improving user convenience, and self-management of the water purifier 100 becomes possible, which provides reliability to a user, and improves overall marketability.

In addition, the present disclosure suggests the structure and arrangement of the filter module 120, the first and second flow path modules 130 and 140, and the faucet module 160, which are easily self-managed in the overall water purification system structure such as water intake, filtration, and water discharge, which makes it possible to guide the user to easily replace the respective modules having different replacement periods.

As described above, although the present disclosure has been described by the limited embodiments and drawings, the present disclosure is not limited thereto, and various modifications and changes may be made by those skilled in the art within an equivalent range of the technical spirit of the present disclosure and the appended claims to be described below.

What is claimed is:

1. A water purifier comprising:
a case forming an outer appearance of the water purifier and including a plurality of components provided therein;
a cover mounted to the case to be opened and closed;
a support frame mounted to the inside of the case and having at least one mounting part;
a filter module detachably mounted to the case through the at least one mounting part and serving to filter and purify introduced raw water;
a first flow path module including at least one flow path through which raw water flows and detachably mounted to the case between the case and the support frame to fix the filter module to the inside of the case;
a second flow path module including at least one flow path through which purified water flows and which is connected to the components and the filter module, the second flow path module being detachably mounted to the case through the at least one mounting part; and
a faucet module mounted to the case to discharge purified water which has been filtered and purified through the components,
wherein the at least one mounting part includes:
a first mounting part in which the filter module is mounted; and
a second mounting part in which the second flow path module is mounted, wherein the second mounting part is disposed at a position adjacent to the first mounting part, and
wherein the filter module is detachably mounted to the case through the first mounting part and the second flow path module is detachably mounted to the case through the second mounting part.

2. The water purifier of claim 1, wherein the filter module includes:
a filter housing having a first handle protruding from one surface thereof; and
at least one filter detachably mounted on the other surface of the filter housing.

3. The water purifier of claim 2, wherein the filter housing includes:
an inflow part, formed at one side to supply raw water to the filter, through which raw water is introduced; and
a discharge part, formed at another side opposite to the inflow part, through which purified water filtered and purified by the filter is discharged.

4. The water purifier of claim 3, wherein the first flow path module includes:
a fixing housing having at least one filter hole into which the filter module is inserted;
at least one nipple provided in the fixing housing to correspond to the inflow part; and
at least one connection pipe connecting the inflow part and the at least one nipple.

5. The water purifier of claim 4, wherein a holder is rotatably provided at one side of an upper portion of the fixing housing, and the filter module is fixed to the first flow path module through the holder in a state in which the filter module is inserted into the filter hole.

6. The water purifier of claim 1, wherein the second flow path module includes:
a flow path housing having one open surface and including a space formed therein;
a housing cover detachably coupled to the open surface of the flow path housing and including a second handle protruding outwardly;
at least one nipple provided in the space of the flow path housing and connected to the plurality of components provided in the case; and
at least one connection pipe provided in the space and connected to the at least one nipple to form the at least one flow path.

7. The water purifier of claim 6, wherein one of the at least one nipple, which is disposed at a position adjacent to the filter module, is directly connected to the filter module so that the purified water discharged from the filter module flows into the second flow path module.

8. The water purifier of claim 6, wherein the at least one nipple provided in the second flow path module is connected to a sterilization module, a cooler, or a valve, or a flow rate sensor, among the plurality of components.

9. The water purifier of claim 6, wherein the support frame is provided with a removal device for fixing the second flow path module mounted in the at least one mounting part to the support frame to correspond to the second flow path module or removing the second flow path module from the at least one mounting part.

10. The water purifier of claim 3, wherein the removal device includes:
a detachment switch mounted to be insertable from one surface of the support frame toward an inside of the case; and
a locker rotatably mounted to an outer side of the other surface of the support frame at a position corresponding to the detachment switch so as to be operated in conjunction with the detachment switch depending on whether the detachment switch is inserted, and configured to lock or unlock the second flow path module to or from the support frame.

11. The water purifier of claim 10, wherein the locker includes:
a rotation shaft rotatably mounted on the other surface of the support frame at a position corresponding to the at least one mounting part in which the second flow path module is mounted;
a hook part extending from the rotation shaft to correspond to the detachment switch and formed to be bent in multiple stages so as to be partially inserted from an outside of the support frame toward the inside of the at least one mounting part when the second flow path module is mounted in the at least one mounting part; and
an ejecting part extending from the rotation shaft toward an opposite side to the hook part and formed to be bent so as to protrude from an outside of the other surface of the support frame toward the other surface of the second flow path module according to an operation of the detachment switch.

12. The water purifier of claim 11, wherein the flow path housing has a locking groove formed in one surface thereof corresponding to the hook part so that the hook part is inserted therein.

13. The water purifier of claim 11, wherein the at least one mounting part, in which the second flow path module is inserted, is provided with opening holes formed at positions corresponding to the hook part and the ejecting part, respectively.

14. The water purifier of claim 1, wherein the faucet module includes:
a faucet housing having one end detachably inserted into the case to be connected to the components provided in the case so that the faucet housing protrudes to an outside of the case by a set length, the faucet housing including a flow path formed therein so as to discharge purified water, cold water, or hot water which has been filtered and purified while passing through the filter module; and a faucet cover detachably mounted on the case while surrounding an outside of the faucet housing.

15. The water purifier of claim 14, wherein a discharge pipe is provided inside the faucet housing to discharge purified water, purified cold water, or purified hot water to the outside of the faucet housing, and the discharge pipe is connected to each of a purified water discharge pipe, a cold water discharge pipe, and a hot water discharge pipe inside the case.

16. The water purifier of claim 14, wherein locking plates for fixing or detaching the faucet housing inserted into the case by a predetermined length to or from the case are integrally formed at both sides of the faucet housing, respectively.

17. The water purifier of claim 16, wherein each of the locking plates includes:

a fixed end portion which is one end of the locking plate and faces the case to be fixed to the faucet housing;

a free end portion which is the other end of the locking plate and faces the outside of the case to be extended from the fixed end portion and elastically supported by the fixed end portion; and a locking protrusion protruding toward the outside of the faucet housing between the fixed end portion and the free end portion.

18. The water purifier of claim 17, wherein the free end portion is formed to be insertable from the outside of the faucet housing toward the inside thereof, and provides an elastic force from the fixed end portion toward the outside of the faucet housing.

19. The water purifier of claim 17, wherein the locking protrusion prevents the faucet housing mounted in the case from being detached from the case.

* * * * *